(No Model.)
J. BARTON.
WARMING PAN.
No. 308,126. Patented Nov. 18, 1884.
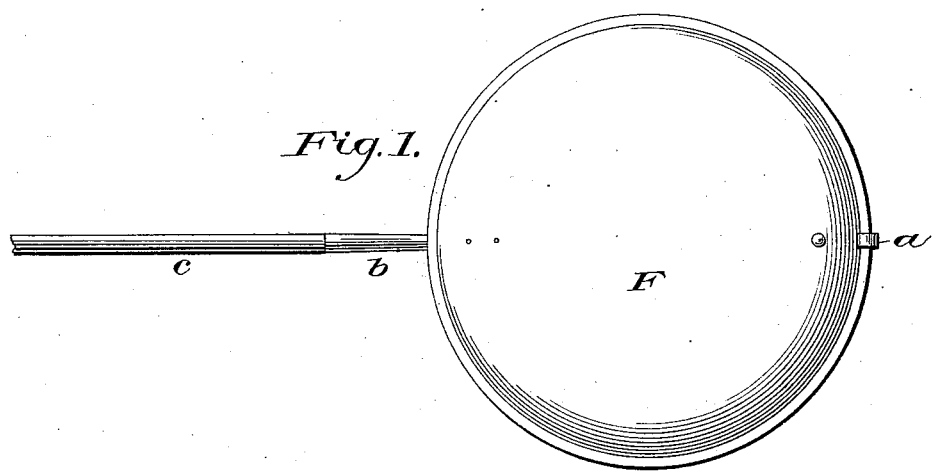
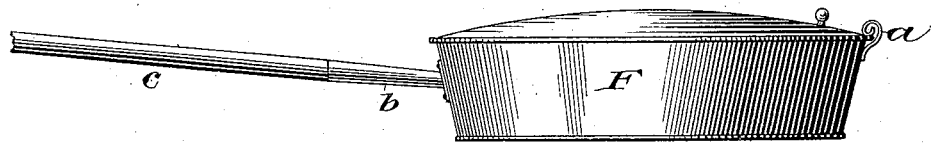
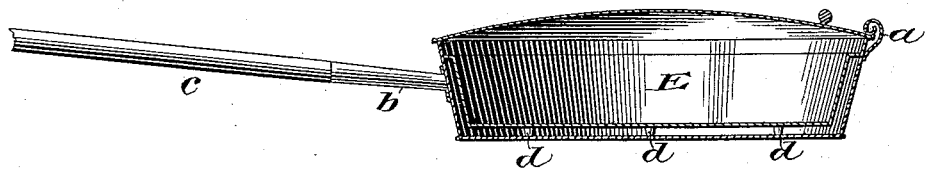
Witnesses:
R. D. Knowles
F. W. Lerchner
Inventor:
Joseph Barton

United States Patent Office.

JOSEPH BARTON, OF JACKSON, MICHIGAN.

WARMING-PAN.

SPECIFICATION forming part of Letters Patent No. 308,126, dated November 18, 1884.

Application filed December 26, 1883. (No model.)

*To all whom it may concern:*

Be it known that I, JOSEPH BARTON, of the city and county of Jackson, and State of Michigan, have invented a new and useful Improvement in Warming-Pans, of which the following is a specification.

The invention relates to a device by which live coals may be so confined as to be used for warming beds safely without danger of burning or injuring bed-clothing or other articles.

Heretofore warming-pans in which live coals are used have consisted simply of an iron, tin, or copper vessel dish-shaped, into which the coals are put and used with a single cover. This is objectionable, because the coals, coming in contact with the vessel, overheat both the pan and cover, and cannot be used without danger of damaging whatever they may come in contact with.

The object of my invention is to so confine the live coals as to govern the heat derived from them, thereby avoiding danger of damage from overheat, and at the same time to secure the best effects of the heat for the purposes needed.

In the drawings, Figure 1 is a plan view of my improved warming-pan. Fig. 2 is a side elevation of the same, and Fig. 3 is a vertical longitudinal section.

The invention consists of the pan E, with feet $d\ d\ d$ one-eighth inch high, and made of such size as to fit into the pan F, with an open space of one-eighth of an inch on all sides. It is confined there by a cover, which, when closed, leaves a like space between it and the pan A. The cover is fastened by the spring-catch $a$. The whole should be made of sheet-copper or galvanized iron.

What I claim as my invention is—

The pan E, in combination with the pan F, the feet $d\ d\ d$, the cover, and the catch $a$, as and for the purposes mentioned.

Jackson, Michigan, December 10, 1883.

JOSEPH BARTON.

In presence of—
　WM. HARVEY POTTS,
　M. BLUSHFIELD.